(No Model.)
H. KLEIMAN.
BRAKE.
No. 514,940. Patented Feb. 20, 1894.
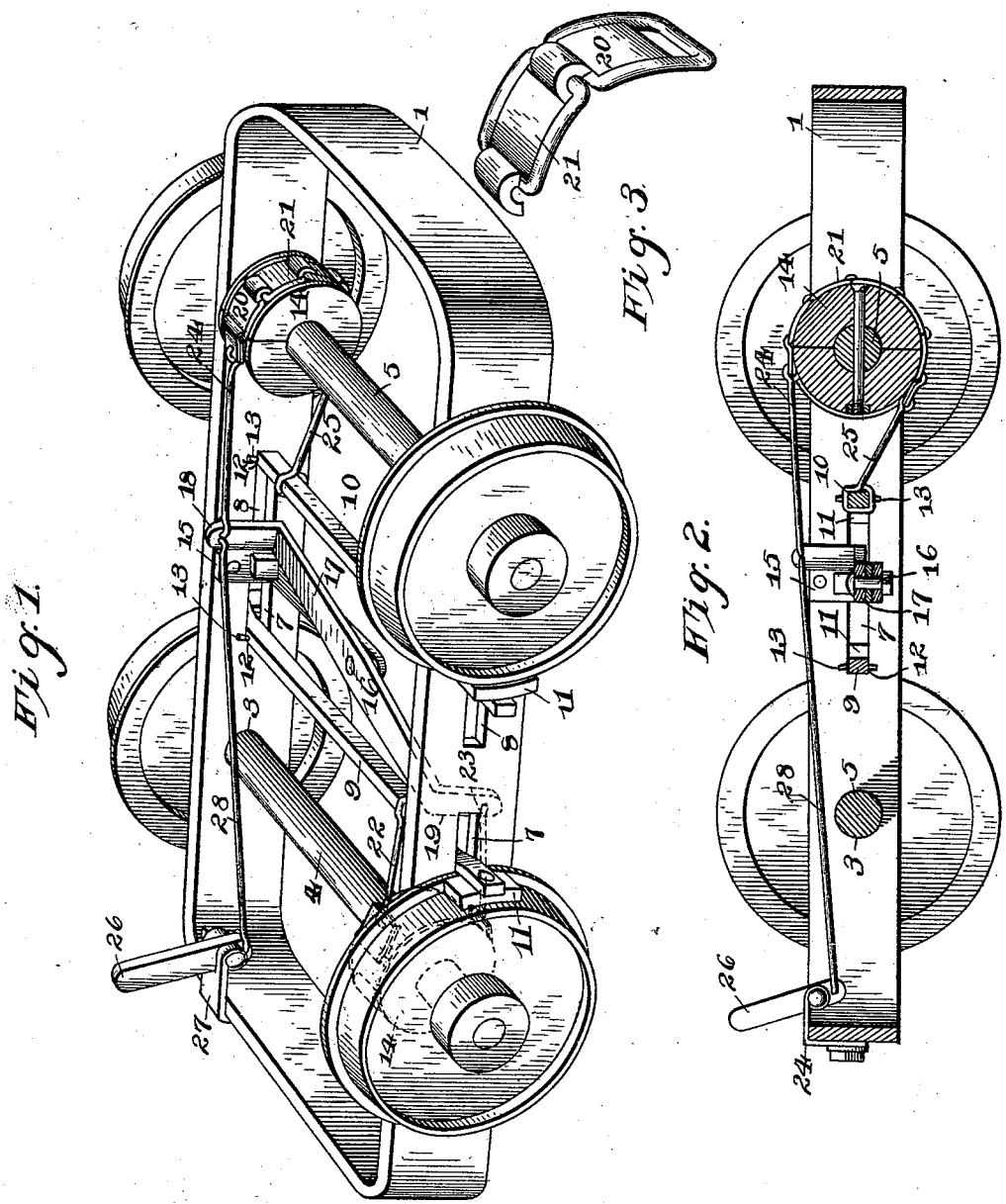
Witnesses:
C. A. Ford.
W. S. Duvall.
Inventor
Henry Kleiman,
By his Attorneys.
C. A. Snow & Co.

UNITED STATES PATENT OFFICE.

HENRY KLEIMAN, OF ALLEGHENY, PENNSYLVANIA.

BRAKE.

SPECIFICATION forming part of Letters Patent No. 514,940, dated February 20, 1894.

Application filed June 9, 1893. Serial No. 477,088. (No model.)

*To all whom it may concern:*

Be it known that I, HENRY KLEIMAN, a citizen of the United States, residing at Allegheny, in the county of Allegheny and State of Pennsylvania, have invented a new and useful Brake, of which the following is a specification.

My invention relates to improvements in brakes for car trucks, and the objects in view are to provide a brake especially adapted to be used in case of emergency and to be operated either by hand or mechanical power and to utilize the brake for applying the same to the rotations of the axles of the truck.

With these and other objects in view the invention consists in certain features of construction hereinafter specified and particularly pointed out in the claims.

Referring to the drawings—Figure 1 is a perspective view of a truck having a brake mechanism embodying my invention. Fig. 2 is a vertical longitudinal sectional view of the same. Fig. 3 is a detail view of a portion of the flexible brake strap.

Like numerals indicate like parts in all the figures of the drawings.

The rectangular truck frame 1 comprises the usual opposite longitudinal side bars and transverse end bars, the said side bars being provided with the usual bearings 2 which may be of any character ordinarily employed.

Arranged in the bearings 3 are the front and rear axles 4 and 5 which beyond the bearings are provided with the wheels themselves.

At each side of the longitudinal centers of each of the side bars of the truck frame elongated slots 7 and 8 are formed. In the slots 7 and 8 transverse brake bars 9 and 10, respectively, are located, and these bars extend beyond the side bars of the frame and are provided with the usual brake shoes 11, the slots being of such length as to permit the bars to move a sufficient distance to apply the shoes to the surface of the wheels. The bars 9 are provided between the side bars of the frame with perforations 12, and into these perforations pins 13 are arranged which prevent any longitudinal movement upon the parts of the bars 9 and 10.

Each of the axles has mounted thereon a split friction-pulley 14, the same being split in order to permit of its ready application to the axles. These pulleys are securely bolted upon the axles so as to move therewith and are of the usual formation. The pulleys are located diagonally opposite each other and adjacent to the opposite side bars of the truck frame. An L-shaped bracket 15 extends from one of said side bars of the truck frame and is located between the slots 7 and 8 therein and extends inward to the transverse center of the frame. At this point there is pivotally mounted upon said bracket by a bolt 16 a lever 17, which at one end, that opposite the rear pulley, has a vertical standard 18 and at its opposite end or that in rear and in line with the front pulley a depending standard 19. Around each of these pulleys there is arranged a friction band 20, said band consisting of a series of sprocket links 21 whose interiors are filled with some metallic substance, the presence of which, it will be observed, does not interfere with the flexibility of the links. These links constitute friction bands. The upper end of the front friction band is by a link 22 connected with the brake bar 9 and its lower end is by a link 23 connected to the lower end of the depending standard 19 of the lever 17. The upper end of the flexible friction band is by a link 24 connected to the upwardly-disposed vertical standard 18, and at its lower end is by a link 25 connected to the rear brake bar 10. This completes the construction of the brake with the exception of means for oscillating the lever 17. Such means may be of any mechanical design preferred, and in the present instance consists of a hand lever 26 fulcrumed between its ends in a bracket 27 located at the front or outer end of the truck, the lower end of said bracket being connected with the upwardly-disposed vertical standard 18 by means of a connecting rod 28. This completes the construction and the operation is as follows:

When it is desired to operate the brake it simply remains to oscillate the lever 17, which, as before stated, may be accomplished in various ways. In the present instance the hand lever is operated for accomplishing this and it, through the medium of its connecting rod, vibrates or oscillates the lever 17 which causes its vertical standard to draw upon the upper end of the rear friction brake band, and causes the depending end of said lever to draw upon the lower end of the friction brake band. Such a movement causes the brake band to snugly hug the friction pulleys and firmly lock thereon so that a further rotation of the wheels and axles carries with them to some extent the brake band thus drawing upon the brake bars 9 and clamping or binding the shoes with great force upon the treads of the wheels, which, of course, brings the car to a sudden stop. It will be seen that the labor of applying the brake is very slight and that the rotations of the wheels themselves will serve this function.

Various changes in the details of my invention will readily suggest themselves to those skilled in the constructions and operations of brakes, and I therefore do not limit my invention to such precise details as are herein shown and described, but hold that I may vary the same to any degree and extent within the knowledge of the skilled mechanic.

Having described my invention, what I claim is—

1. The combination with a truck frame, the axles and ground wheels, said truck frame being provided with opposite supports, of brake bars arranged in the supports, extending beyond the same and provided with brake shoes for clamping against the wheels, friction pulleys arranged upon the axles, a centrally located vibratory lever provided at its opposite ends with oppositely-disposed standards, flexible friction shoes arranged upon pulleys, connections between the ends of the standards with the opposite ends of the shoes and between the remaining ends of the shoes and the brake bars, and means for vibrating the lever, substantially as specified.

2. The combination with a truck having the opposite pairs of bearings, the axles arranged therein, the friction pulleys arranged upon the axles diagonally opposite each other, and the link friction band, of slots formed in the longitudinal center of the side bars of the truck frame, a bracket supported by the frame between the slots, a vibratory lever mounted on the bracket and having oppositely extending standards, links between the adjacent ends of the standards and of the brake shoes, brake bars arranged in slots formed in the side bars and extending beyond the same and provided with brake shoes for contacting with the wheels, and links connecting the remaining ends of the friction bands with the brake bars, a lever pivoted upon the frame, and connections between the upper lever and the upper standard, substantially as specified.

3. The combination with the truck frame, the front and rear axles and the wheels, of the pulleys arranged upon the axles, and the flexible brake straps, and means for operating the same, said brake straps each consisting of a series of sprocket links having their frames filled with metal blocks, substantially as specified.

4. The truck frame, axle and wheels, the brake bars 9 and 10, the pulleys 14 mounted on the axles, the flexible bands passed around the pulleys and secured at one end to the adjacent brake bar, and mechanism connected to the other ends of the flexible bands for operating the brakes, substantially as described.

5. The truck frame, axles and wheels, the brake-bars 9 and 10, the lever 17, the pulleys 14 mounted on the axles, and the flexible bands passed around the pulleys and secured at one end to the lever 17 and at the other end to the adjacent brake-bar, as set forth.

In testimony that I claim the foregoing as my own I have hereto affixed my signature in the presence of two witnesses.

HENRY KLEIMAN.

Witnesses:
W. H. HILL,
W. H. ARTZBERGER.